(12) United States Patent
Li et al.

(10) Patent No.: US 11,089,266 B2
(45) Date of Patent: Aug. 10, 2021

(54) COMMUNICATION PROCESSING METHOD, TERMINAL, AND STORAGE MEDIUM

(71) Applicant: TENCENT TECHNOLOGY (SHENZHEN) COMPANY LTD, Guangdong (CN)

(72) Inventors: Bin Li, Shenzhen (CN); Xiao Bo Chen, Shenzhen (CN); Cheng Luo, Shenzhen (CN); Wen Ting Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/658,354

(22) Filed: Oct. 21, 2019

(65) Prior Publication Data
US 2020/0053318 A1     Feb. 13, 2020

Related U.S. Application Data

(63) Continuation of application No. PCT/CN2018/114080, filed on Nov. 6, 2018.

(30) Foreign Application Priority Data

Nov. 17, 2017  (CN) .......................... 201711147383.5

(51) Int. Cl.
*H04N 7/15*     (2006.01)
*G06T 7/73*     (2017.01)
(Continued)

(52) U.S. Cl.
CPC ............. *H04N 7/157* (2013.01); *G06F 3/011* (2013.01); *G06F 3/04815* (2013.01);
(Continued)

(58) Field of Classification Search
CPC ......... G06T 7/74; G06T 13/40; G06T 19/006; H04W 4/029; G06F 3/04815; G06F 3/011;
(Continued)

(56) References Cited

U.S. PATENT DOCUMENTS

2003/0001863 A1*  1/2003  Davidson .............. G06F 1/1694
                                                              345/619
2014/0146178 A1   5/2014  Kim et al.
(Continued)

FOREIGN PATENT DOCUMENTS

CN     101677386 A     3/2010
CN     102307292 A     1/2012
(Continued)

OTHER PUBLICATIONS

International Search Report of PCT/CN2018/114080 dated Jan. 30, 2019.

*Primary Examiner* — Roland J Casillas
(74) *Attorney, Agent, or Firm* — Sughrue Mion, PLLC

(57) ABSTRACT

A communication processing method is provided. A communication connection to at least one second terminal is established. A virtual image of a first user corresponding to the first terminal and a virtual image of a second user corresponding to the at least one second terminal are obtained. A real-scene image of an environment in which the first terminal is located is captured. First communication background information is generated based on the real-scene image of the environment in which the first terminal is located. The virtual image of the first user and the virtual image of the second user are to the first communication background information, to obtain a communication image to be used in communication between the first terminal and the at least one second terminal.

15 Claims, 7 Drawing Sheets

(51) Int. Cl.
  *H04W 4/029* (2018.01)
  *G06F 3/01* (2006.01)
  *G06F 3/0481* (2013.01)
  *G06K 9/00* (2006.01)
  *G06T 13/40* (2011.01)
  *G06T 19/00* (2011.01)

(52) U.S. Cl.
  CPC ............ *G06K 9/00671* (2013.01); *G06T 7/74* (2017.01); *G06T 13/40* (2013.01); *G06T 19/006* (2013.01); *H04W 4/029* (2018.02)

(58) Field of Classification Search
  CPC .... G06K 9/00671; A63F 13/655; H04N 7/157
  See application file for complete search history.

(56) References Cited

U.S. PATENT DOCUMENTS

2015/0356788 A1* 12/2015 Abe .................... A63F 13/5255
  345/633
2017/0026612 A1* 1/2017 Rintel .................... G06F 3/013

FOREIGN PATENT DOCUMENTS

| CN | 106657060 A | 5/2017 |
| CN | 108881784 A | 11/2018 |

\* cited by examiner

COMMUNICATION PROCESSING METHOD, TERMINAL, AND STORAGE MEDIUM

CROSS-REFERENCE TO RELATED APPLICATION(S)

This application is a continuation application of International Application No. PCT/CN2018/114080, filed on Nov. 6, 2018, which claims priority to Chinese Patent Application No. 201711147383.5, entitled "COMMUNICATION PROCESSING METHOD, TERMINAL, AND STORAGE MEDIUM" filed on Nov. 17, 2017, the disclosures of which are incorporated herein by reference in their entireties.

BACKGROUND

1. Field

Example embodiments of the disclosure relate to processing technologies of communication information, and in particular, to a communication processing method, a terminal, and a storage medium.

2. Description of the Related Art

Currently, real-time chat software based on real character images is widely in use, and real-time chat based on three-dimensional (3D) virtual characters is also used in some game applications.

However, existing real-time chat software does not employ a combination of characters and a current background and therefore cannot provide visual experience of more real-time interaction.

SUMMARY

One or more example embodiments provide a communication processing method, a terminal, and a storage medium.

According to an aspect of an example embodiment, there is provided a communication processing method, performed by a first terminal, the first terminal including at least one memory and at least one processor. A communication connection to at least one second terminal is established. A virtual image of a first user corresponding to the first terminal and a virtual image of a second user corresponding to the at least one second terminal are obtained. A real-scene image of an environment in which the first terminal is located is captured. First communication background information is generated based on the real-scene image of the environment in which the first terminal is located. The virtual image of the first user and the virtual image of the second user are to the first communication background information, to obtain a communication image to be used in communication between the first terminal and the at least one second terminal.

The method may further include: capturing a real-scene image of a changed environment based on a change of the environment in which the first terminal is located; updating the first communication background information by using the real-scene image of the changed environment; and combining the virtual image of the first user, the virtual image of the second user, and the updated first communication background information, to obtain an updated communication image to be used in the communication between the first terminal and the at least one second terminal.

The capturing the real-scene image of the changed environment may include: determining, in response to detection of movement of the first terminal, that the environment in which the first terminal is located changes, and capturing the real-scene image of the changed environment.

The capturing the real-scene image of the changed environment may include: determining, in response to detection of rotation of the first terminal, that the environment in which the first terminal is located changes, and capturing the real-scene image of the changed environment.

The combining the virtual image of the first user, the virtual image of the second user, and the updated first communication background information may include: obtaining at least one of a moving direction and a moving distance of the first terminal in response to detection of the movement of the first terminal; adjusting the virtual image of the first user and the virtual image of the second user based on the at least one of the moving direction and the moving distance, to obtain adjusted virtual images; and combining the adjusted virtual images and the first communication background information, to obtain the updated communication image to be used in the communication between the first terminal and the at least one second terminal.

The combining the virtual image of the first user, the virtual image of the second user, and the updated first communication background information may include: obtaining at least one of a rotation direction and a rotation angle of the first terminal in response to detection of a rotation of the first terminal; adjusting the virtual image of the first user and the virtual image of the second user based on the at least one of the rotation direction and the rotation angle, to obtain adjusted virtual images; and combining the adjusted virtual images and the first communication background information, to obtain the updated communication image to be used in the communication between the first terminal and the at least one second terminal.

The establishing the communication connection to the at least one second terminal may include: initiating a communication request to the at least one second terminal by using a server, the communication request including information about the at least one second terminal; receiving information indicating that virtual call space is successfully created based on the communication request and information on a data resource allocated to the first terminal; establishing a data channel with the server based on the data resource allocated to the first terminal; and establishing, by the first terminal, the communication connection to the at least one second terminal through the established data channel.

The method may further include: capturing a voice message of the first user, and transmitting the voice message to the at least one second terminal based on the communication connection.

According to an aspect of an example embodiment, there is provided a terminal, including: at least one memory operable to store program code; and at least one processor operable to read the program code and operate as instructed by the program code, the program code including: real-time call code configured to cause at least one of the at least one processor to establish a communication connection to at least one second terminal; and call interface code configured to cause at least one of the at least one processor to: obtain a virtual image of a first user corresponding to the terminal and a virtual image of a second user corresponding to the at least one second terminal; capture a real-scene image of an environment in which the terminal is located; generate first communication background information based on the real-scene image of the environment in which the terminal is located; and combine the virtual image of the first user, the virtual image of the second user, and the first communication background information, to obtain a communication image to be used in communication between the terminal and the at least one second terminal.

The call interface code may cause at least one of the at least one processor to: update the first communication background information based on an image of a changed environment in which the terminal is located; and combine the virtual image of the first user, the virtual image of the second user, and the updated first communication background information, to obtain an updated communication image to be used in the communication between the terminal and the at least one second terminal.

The call interface code may cause at least one of the at least one processor to determine, in response to detection of movement of the terminal, that the environment in which the terminal is located changes, and capture the real-scene image of the changed environment.

The call interface code may cause at least one of the at least one processor to determine, in response to detection of rotation of the terminal, that the environment in which the terminal is located changes, and capture the real-scene image of the changed environment.

The call interface code may cause at least one of the at least one processor to: obtain at least one of a moving direction and a moving distance of the terminal in response to detection of the movement of the terminal; adjust the virtual image of the first user and the virtual image of the second user based on the at least one of the moving direction and the moving distance, to obtain adjusted virtual images; and combine the adjusted virtual images and the first communication background information, to obtain the updated communication image to be used in the communication between the terminal and the at least one second terminal.

The call interface code may cause at least one of the at least one processor to: obtain at least one of a rotation direction and a rotation angle of the terminal in response to detection of rotation of the terminal; adjust the virtual image of the first user and the virtual image of the second user based on the at least one of the rotation direction and the rotation angle, to obtain adjusted virtual images; and combine the adjusted virtual images and the first communication background information, to obtain the updated communication image for the communication between the terminal and the at least one second terminal.

The real-time call code may cause at least one of the at least one processor to: initiating a communication request to the at least one second terminal by using a server, the communication request including information about the at least one second terminal; receiving information indicating that virtual call space is successfully created based on the communication request and information on a data resource allocated to the terminal; establishing a data channel with the server based on the data resource allocated to the terminal; and establishing, by the terminal, the communication connection to the at least one second terminal through the established data channel.

The real-time call code may cause at least one of the at least one processor to capture a voice message of the first user, and transmit the voice message to the at least one second terminal based on the communication connection.

According to an aspect of an example embodiment, there is provided a non-transitory computer readable storage medium, storing computer-readable instructions executable by at least one processor to perform: establishing a communication connection to at least one second terminal; obtaining a virtual image of a first user corresponding to a first terminal and a virtual image of a second user corresponding to the at least one second terminal; capturing a real-scene image of an environment in which the first terminal is located; generating first communication background information based on the real-scene image of the environment in which the first terminal is located; and combining the virtual image of the first user, the virtual image of the second user, and the first communication background information, to obtain a communication image to be used in communication between the first terminal and the at least one second terminal.

The computer-readable instructions may be executable by the at least one processor to perform: capturing a real-scene image of a changed environment based on a change of the environment in which the first terminal is located; updating the first communication background information by using the real-scene image of the changed environment; and combining the virtual image of the first user and the virtual image of the second user to the updated first communication background information, to obtain an updated communication image to be used in the communication between the first terminal and the at least one second terminal.

The computer-readable instructions may be executable by the at least one processor to perform: determining, in response to detection of movement of the first terminal, that the environment in which the first terminal is located changes, and capturing the real-scene image of the changed environment.

The computer-readable instructions may be executable by the at least one processor to perform: determining, in response to detection of rotation of the first terminal, that the environment in which the first terminal is located changes, and capturing the real-scene image of the changed environment.

BRIEF DESCRIPTION OF THE DRAWINGS

To describe the technical solutions in the example embodiments of the disclosure more clearly, the following briefly describes the accompanying drawings. Apparently, the accompanying drawings in the following descriptions show merely some embodiments, and a person of ordinary skill in the art may still derive other drawings from these accompanying drawings without creative efforts.

DETAILED DESCRIPTION

To make the objectives, technical solutions, and advantages of the disclosure clearer and more comprehensible, the following further describes the disclosure in detail with reference to the accompanying drawings and embodiments. It is to be understood that the embodiments described herein are merely used for explaining the disclosure and not intended to limit the disclosure.

Implementation of the technical solutions is further described in detail with reference to the accompanying drawings.

Figure 1:
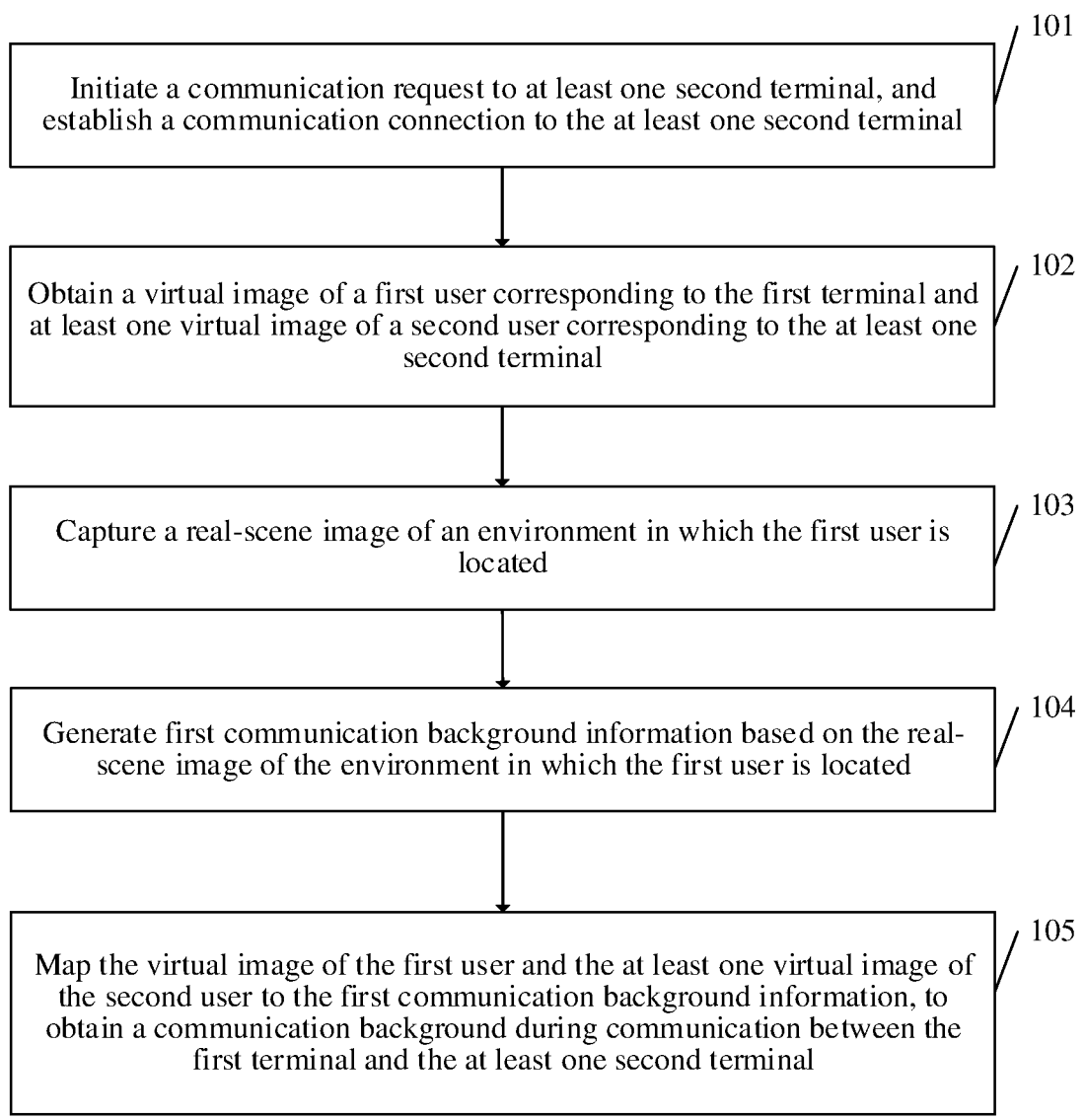
FIG. 1 is a schematic flowchart of a communication processing method according to an example embodiment.

An example embodiment provides a communication processing method, applied to a first terminal. As shown in FIG. 1, the communication processing method includes the following operations:

Operation 101: Initiate a communication request to at least one second terminal, and establish a communication connection to the at least one second terminal.

Operation 102: Obtain a virtual image of a first user corresponding to first terminal and at least one virtual image of a second user corresponding to the at least one second terminal.

Operation 103: Capture a real-scene image of an environment in which the first user is located (or an environment in which the first terminal is located).

Operation 104: Generate first communication background information based on the real-scene image of the environment in which the first user is located.

Operation 105: Map (or combine, or add, or superimpose) the virtual image of the first user and the at least one virtual image of the second user to the first communication background information, to obtain a communication background during communication between the first terminal and the at least one second terminal.

The first terminal herein may be a device that can establish a communication connection to another terminal through a mobile communications network or a wireless network. For example, the first terminal may be a smartphone, a tablet computer, a notebook computer, a wearable device, or the like. Examples are not exhaustive in this embodiment and the disclosure is not limited.

It may be understood that although terms such as "first" and "second" are used for a plurality of times in the disclosure to describe various elements (or various communication images or various communication backgrounds) and the like, these elements (or these communication images or these communication backgrounds) should not be limited to these terms. These terms are merely used for distinguishing one element (or one communication image or one communication background) from another element (or another communication image or another communication background). For example, the first terminal and the second terminal herein are used for distinguishing between different terminals, and both the first terminal and the second terminal may be referred to as terminals provided that no ambiguity is caused. The first user and the second user are used for distinguishing between each other, and both the first user and the second user may be referred to as users provided that no ambiguity is caused.

In an example embodiment, in operation 101, that the first terminal initiates the communication request to the at least one second terminal may initiate the communication request through the mobile communications network. For example, the first terminal may initiate the communication request to the second terminal by dialing a phone number of the second terminal or by using an account in a preset application. Establishing the communication connection may establish a communication connection among a plurality of terminals by using a server or may establish a communication connection by using a core network and a device such as a base station in the mobile communications network. Examples are not exhaustive in the disclosure and an implementation of establishing the communication connection is not limited. In an example embodiment, there may be one or more second terminals.

In an example embodiment, the initiating a communication request to at least one second terminal, and establishing a communication connection to the at least one second terminal may include the following operations:

initiating the communication request by using a server, where the communication request is used for requesting to create virtual call space, and the communication request includes information about the at least one second terminal; receiving, from the server, information indicating that the virtual call space is successfully created, wherein the information indicating that the virtual call space is successfully created includes a data resource allocated to the first terminal; establishing a data channel with the server based on the data resource allocated to the first terminal; and establishing, by the first terminal, the communication connection to the second terminal through the established data channel in a case that it is detected that the at least one second terminal accepts the communication request of the first terminal.

The request for creating the virtual call space may be a request for opening call space for a call initiated by the first terminal. That is, after the request is sent to the server, a server side (e.g., a real-time signaling server (Svr)) allocates a specific communication data resource to the first terminal.

In an example embodiment, after receiving a call request from a Client A, the real-time signaling server Svr creates a real-time room (or a real-time chat room). Then, the real-time signaling Svr applies to a real-time data server (Svr) for a data resource (which is mainly an access IP or the like).

In an example embodiment, the server (namely, the real-time signaling Svr) returns, to the first terminal, data indicating successful creation, and the server side transmits the communication request to the at least one second terminal.

In an example embodiment, when the first terminal receives the information indicating that the virtual call space is successfully created that is sent by the server, the first terminal establishes the data channel with the server (e.g., the real-time signaling Svr), so that when receiving that the second terminal accepts the communication request, the first terminal instantly communicates with the second terminal through the established data channel.

In an example embodiment, after the first terminal and the at least one second terminal establish channels, the communication processing method further includes an operation of capturing a voice message of the first user corresponding to the first terminal. The operation may include: enabling a voice capture unit (for example, a microphone) when the communication connection is established, and capturing the voice message by using the voice capture unit.

Figure 2:
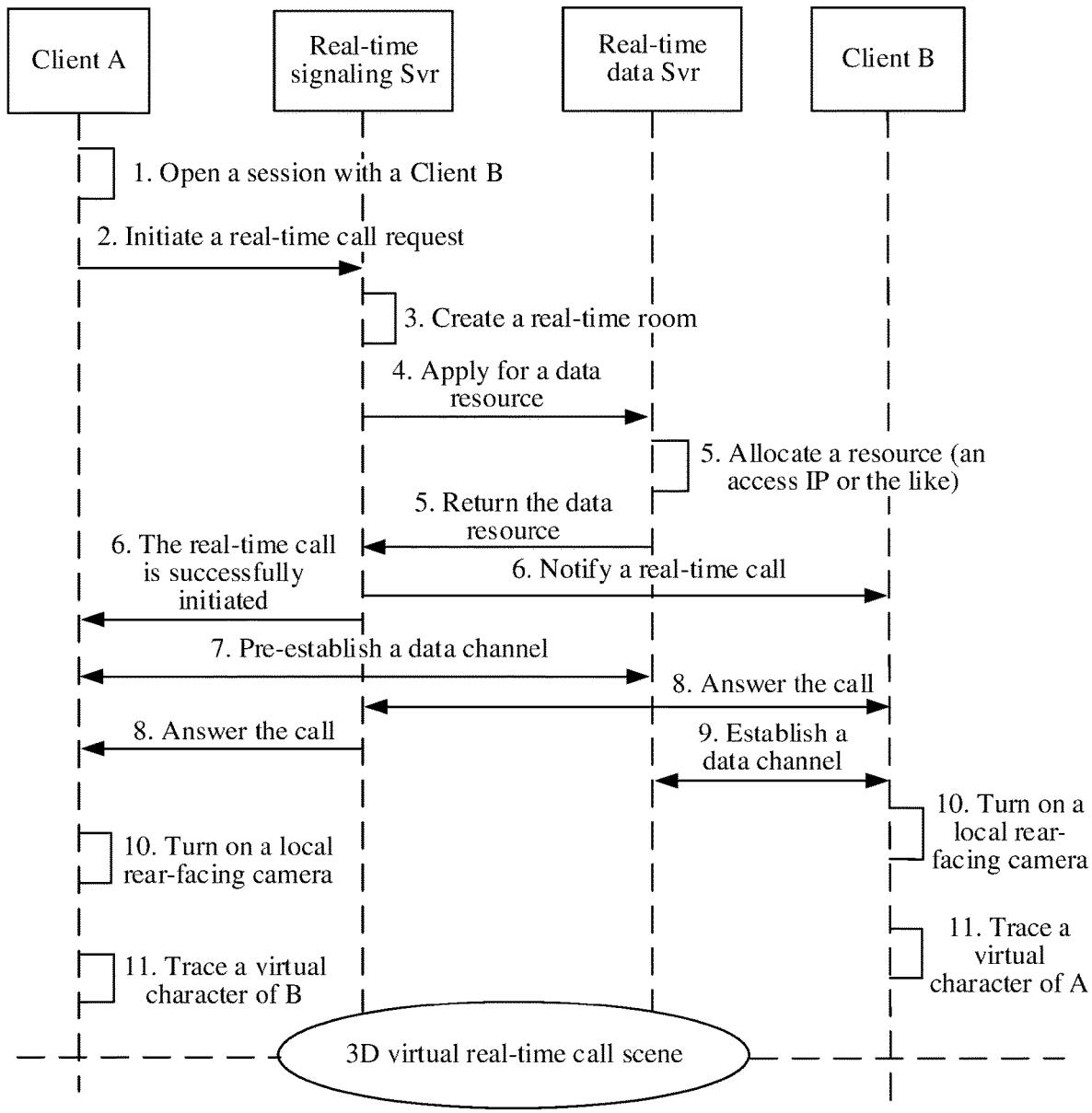
FIG. 2 is a sequence diagram of operations of establishing a real-time call according to an example embodiment.

In an example embodiment, with reference to FIG. 2, a processing method for voice capture and communication in operation 101 is described:

1. The Client A (or the first terminal) opens a session interface with a Client B (or the second terminal).

2. The Client A taps a call button by using the session interface to initiate a real-time call request, and the real-time call request is sent to the real-time signaling server (Svr) on the server side.

3. After receiving the call request from the Client A, the real-time signaling Svr on the server side creates a real-time room.

4. The real-time signaling Svr on the server side applies to the real-time data Svr for a data resource (which is mainly an access IP or the like).

5 and 6. Return, to the Client A, data indicating successful creation. In addition, the real-time signaling Svr on the server side pushes a call notification (including information about the data resource) to the Client B.

7. After receiving a result indicating that the real-time room (e.g., real-time chat room) is successfully created, the Client A starts pre-establishing a data channel with the real-time data Svr on the server side based on data access information. An objective of the pre-establishment herein is to enable entering a call process more quickly once the Client B answers the call.

8 and 9. After receiving the call notification from the Client A, the Client B answers the call and starts establishing a data channel with the real-time data Svr. Once the data channel is established, real-time data transmitting and receiving can be performed between the Client A and the Client B. If the Client B rejects the call, the real-time signaling Svr pushes a rejection notification to the Client A. After receiving the rejection notification, the Client A disconnects the data channel from the real-time data Svr, and ends the call.

10. After the data channels of the Client A and the Client B are both successfully established, the Client A and the Client B turn on respective audio devices, perform recording and transmitting, and receiving and playing of voice data, and turn on respective local rear-facing cameras, to prepare to perform image capture. In an example embodiment, the first terminal (or the Client A) and the second terminal (or the Client B) may include the rear-facing camera or may be connected to the rear-facing camera.

It is to be noted that an establishment process for a real-time call among a plurality of users is similar to that between two users, and only a process of selecting a participant list is added when a call is initiated.

A process of generating a communication interface based on an image of an environment is described in detail below:

In an example embodiment, a manner of generating the first communication background information in the foregoing operation may directly use the image of the environment in which the first user is located as a first communication background. The image of the environment in which the first user is located may be processed, and the processed image is used as the first communication background.

It may be understood that a manner of processing the image of the environment in which the first user is located may include a plurality of manners of processing such as gray-scale processing, and color, color tone, and saturation processing.

In an example embodiment, operation 102, operation 103, operation 104, and operation 105 may be based on some example scenarios as follows:

First Scenario:

When the virtual image is mapped to (or combined with) the first communication background information for the first time, the virtual image may be mapped to a preset location in the first communication background information. The preset location may be a middle location (or a center location of the first communication background), or may be another location set by the user. Examples are not exhaustive herein.

Figure 3:
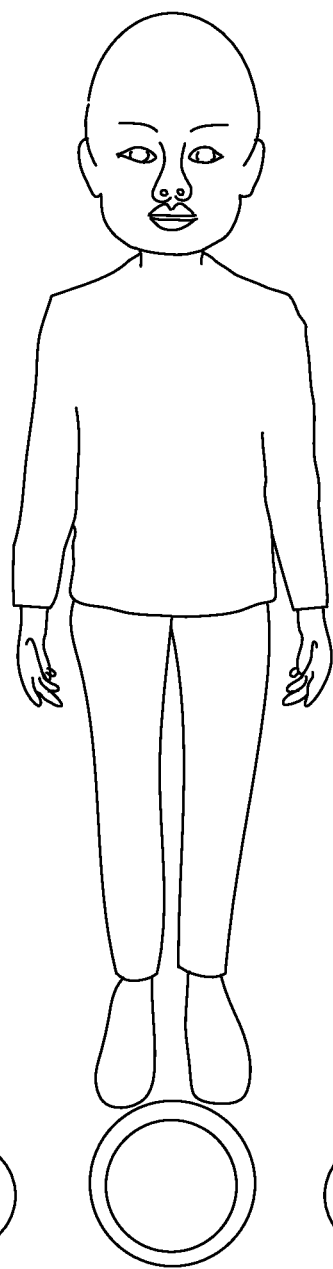
FIG. 3 is a schematic diagram of an interface on which a terminal of a first user displays a virtual image of the first user to form a communication background image according to an example embodiment.

In an example embodiment, a schematic diagram of this scenario is illustrated in FIG. 3. The virtual image of the first user is placed at the middle location in the first communication background corresponding to the first communication background information to obtain a first communication image, and then the first communication image is presented on a display area of the communication interface. In this scenario, the user can only view a picture including the virtual image of the user. That is, in this scenario, only the first communication image formed by using the virtual image of the first user is presented on the display area of the terminal of the first user regardless of whom the user communicates with. The first communication image is a communication background image (or a communication image) presented by the first terminal.

In an example embodiment, the virtual image of the second user may alternatively be obtained (where for example, the virtual image of the second user corresponding to the second terminal is obtained from the server side), the virtual image of the second user is combined with the first communication background information to obtain a first communication image including the virtual image of the second user, and the first communication image is presented on a display area. In this case, when the first user communicates with the second user, the first user can view, on the display area of the communication interface, the first communication image formed by using the virtual image of the second user.

Figure 4:
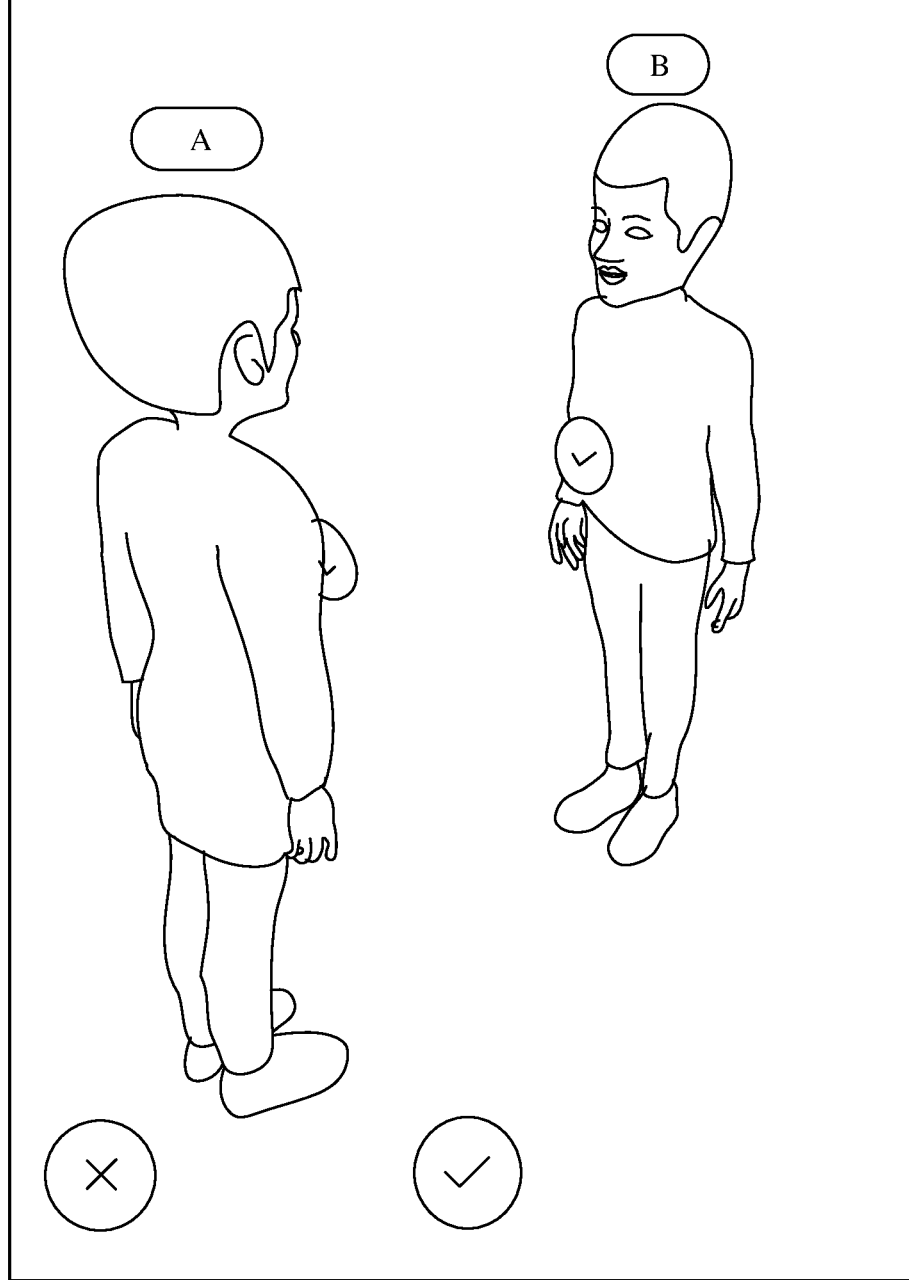
FIG. 4 is a schematic diagram of an interface of interaction between two users according to an example embodiment.

In an example embodiment, there may alternatively be another manner of creating the first communication image. That is, virtual images of the first user and the second user are combined with the first communication background information to obtain a first communication image, and the first communication image is displayed on a display area of the communication interface. A specific location for placing the virtual image of the first user and a specific location for placing the virtual image of the second user may be set depending on an embodiment. Further, the virtual images may be dragged based on an actual requirement, to drag the virtual image of each user to a location at which the user wants to view the virtual images. For example, as shown in FIG. 4, an interface of interaction between two users, namely, a user A and a user B, is currently presented, and virtual images of the user A and the user B are both presented at corresponding locations in the interface (which may be preset locations or locations to which the virtual images of the user A and the user B are dragged).

Second Scenario:

When the image of the environment changes, that is, after mapping is performed for the first time, and when the virtual image is mapped to the first communication background information for the second time or more, the communication processing method further includes the following:

updating the first communication background information based on a real-scene image of a changed environment; remapping the virtual image of the first user and/or the virtual image of the second user to the updated first communication background information, to obtain an updated first communication image for the communication with the second terminal; and then presenting the first communication image on a display area of a communication interface in the terminal device of the first user.

In an example embodiment, processing of updating the first communication image in the second scenario is specifically described. Specifically, the following operations may be included:

In an example embodiment, in response to detection of moving of the first terminal, it is determined that the environment in which the first user is located (or the environment in which the first user is located) changes, and the image of the changed environment in which the first user is located is captured.

In an example embodiment, in response to detection of rotation of the first terminal, it is determined that the environment in which the first user is located changes, and the image of the changed environment in which the first user is located is captured.

In an example embodiment, detecting moving of the first terminal may include determining, based on a change of a currently captured image, whether the first terminal moves. For example, when the first terminal moves back and forth, a local area of the currently captured image being zoomed in or an increase in a quantity of images of the environment captured may occur, and whether the first terminal moves may be determined based on the change of the image of the environment.

When the first terminal moves, the currently captured image is used as the image of the changed environment.

In an example embodiment, detecting rotation of the first terminal may include detecting performed by using a sensor built in the first terminal, and the sensor may be a gyroscope. When the rotation is detected based on the gyroscope, a current image may be captured as the image of the changed environment.

Further, after a real-time call is established, the local rear-facing camera is turned on, and a real-scene image captured in real time is used as a background of a chat scene. Therefore, the background changes as the camera moves, to converge a virtual character with a real scene.

In an example embodiment, the operation of mapping the virtual image of the first user and the at least one virtual image of the second user to the updated first communication background information, to obtain an updated communication background during the communication between the first terminal and the second terminal may include:

obtaining at least one of a moving direction and a moving distance of the first terminal in response to detection of the moving of the first terminal; adjusting the virtual image of the first user and the at least one virtual image of the second user based on the at least one of the moving direction and the moving distance, to obtain adjusted virtual images; and mapping the adjusted virtual images to the first communication background information, to obtain the updated communication background for the communication between the first terminal and the second terminal.

In an example embodiment, the moving direction may include a plurality of directions such as front, behind, left, right, up, and down. The foregoing several directions are merely examples and the disclosure is not limited thereto. In an example implementation, the moving direction may be a combination of a plurality of directions such as front and up, and left and down. The moving distance may be indicated by using two coordinate axes in a built-in three-dimensional coordinate system. For example, the three-dimensional coordinate system built in the first terminal includes three axial directions, namely, X, Y, and Z, and moving directions in the three axial directions may be used for indicating the moving direction.

Adjusting the virtual image based on the at least one of the moving direction and the moving distance may include that, when the moving direction and the moving distance are in a Z-axis direction, zoom-in and zoom-out of the virtual image may be determined based on whether a change direction in the Z axis is a positive direction or a negative direction.

Alternatively, when the captured image of the environment is zoomed in (that is, a local image in the currently captured image of the environment is zoomed in to an entire screen), a multiple by which the image is zoomed in may be obtained, and then the virtual image is zoomed in at a same ratio. Otherwise, when there is more environment content in the captured image of the environment (where for example, a target area may be detected), it may be considered that the image is zoomed out, a zoom-out ratio is obtained, and the virtual image in the first communication image is zoomed out at a same ratio.

In an example embodiment, the virtual image in the first communication image may be considered as the virtual image of the first user, or the virtual image of the first user and the virtual image of the second user. For example, when the first communication image only includes the virtual image of the first user, the virtual image of the first user in the first communication image may be zoomed in or zoomed out according to movement of the terminal of the first user. When the first communication image includes the virtual images of the first user and the second user, only the virtual image of the first user may be zoomed in or zoomed out according to movement of the terminal of the first user. However, the disclosure is not limited thereto, and the virtual images of the first user and the second user may be both zoomed in or zoomed out based on setting of the user.

That is, when the rear-facing camera moves, a change of the current background is detected and traced in real time, and a location of the virtual character image is remapped, to achieve an augmented reality (AR) experience effect that changes according to the distance and the direction of the movement of the first terminal (or the rear-facing terminal). For example, the virtual character image may be zoomed out and zoomed in based on different distances of movement of the first terminal (or the camera), and the virtual character image may be displayed at different angles based on different directions of movement of the first terminal (or the camera).

In an example embodiment, when the first terminal moves in a horizontal direction, the virtual image does not need to be zoomed in or zoomed out, and only the location of the virtual image in the first background image may be adjusted. For example, in a case where a distance for which the first terminal moves in an X-axis direction is a, and a distance for which the first terminal moves in a Y-axis direction is b, the virtual image may be adjusted by the distance a in the X-axis and adjusted by the distance b in the Y-axis. Alternatively, the virtual image may be adjusted at a ratio between the distance a and the distance b in the X-axis and the Y-axis.

In an example embodiment, the operation of mapping the virtual image of the first user and the at least one virtual image of the second user to the updated first communication background information, to obtain an updated communication background during the communication between the first terminal and the second terminal may include:

obtaining at least one of a rotation direction and a rotation angle of the first terminal in response to detection of the rotation of the first terminal; adjusting the virtual image of the first user and the at least one virtual image of the second user based on the at least one of the rotation direction and the rotation angle, to obtain adjusted virtual images; and mapping the adjusted virtual images to the first communication background information, to obtain the updated communication background for the communication with the second terminal.

In an example embodiment, a distance effect (or an effect of creating a distance change) according to movement of the first terminal is achieved by calculating a change ratio of the background in real time while using the virtual character image as a mark point, to zoom the virtual character image. A direction effect (or an effect of creating a direction change) is achieved by calculating a rotation angle by using a change result of the gyroscope in the first terminal (e.g., mobile phone) and then rotating the current character image according to the rotation angle. It may be understood that the rotation angle may be a rotation angle corresponding to each axial direction in the three-dimensional coordinate system built in the first terminal, and the rotation angle of the virtual image may be adjusted by using the rotation angle of each axial direction.

In an example embodiment, the first terminal may transmit the generated first communication image to the at least one second terminal, so that the at least one second terminal generates, based on the first communication image, a communication interface to be presented by the second terminal.

In an example embodiment, the communication processing method may further include: receiving, through the communication connection, at least one second communication image sent by the at least one second terminal; and generating a communication interface based on the at least one second communication image, and presenting the communication interface.

That is, when obtaining the first communication image, the first terminal may transmit the first communication image to the second terminal, so that the second terminal obtains the communication image of the first user of the first terminal. In addition, the first terminal also generates the communication interface of the first terminal. A specific generation manner may be directly combining the second communication image of each second terminal and presenting the combined second communication image on the communication interface of the first terminal.

In an example embodiment, the first terminal may extract the virtual image of the user of the second terminal in the second communication image, and place the virtual image in the first communication background information to generate the communication interface of the first terminal.

In an example embodiment, the first terminal may combine the virtual image of the user of the second terminal and the virtual image of the first user of the first terminal, and then present the combined virtual image in the first communication background information, to generate the communication interface of the first terminal.

In an example embodiment, the first terminal may alternatively respectively set the first communication image and the at least one second communication image on different display areas, and form the communication interface of the first terminal by using the different display areas.

Figure 5:
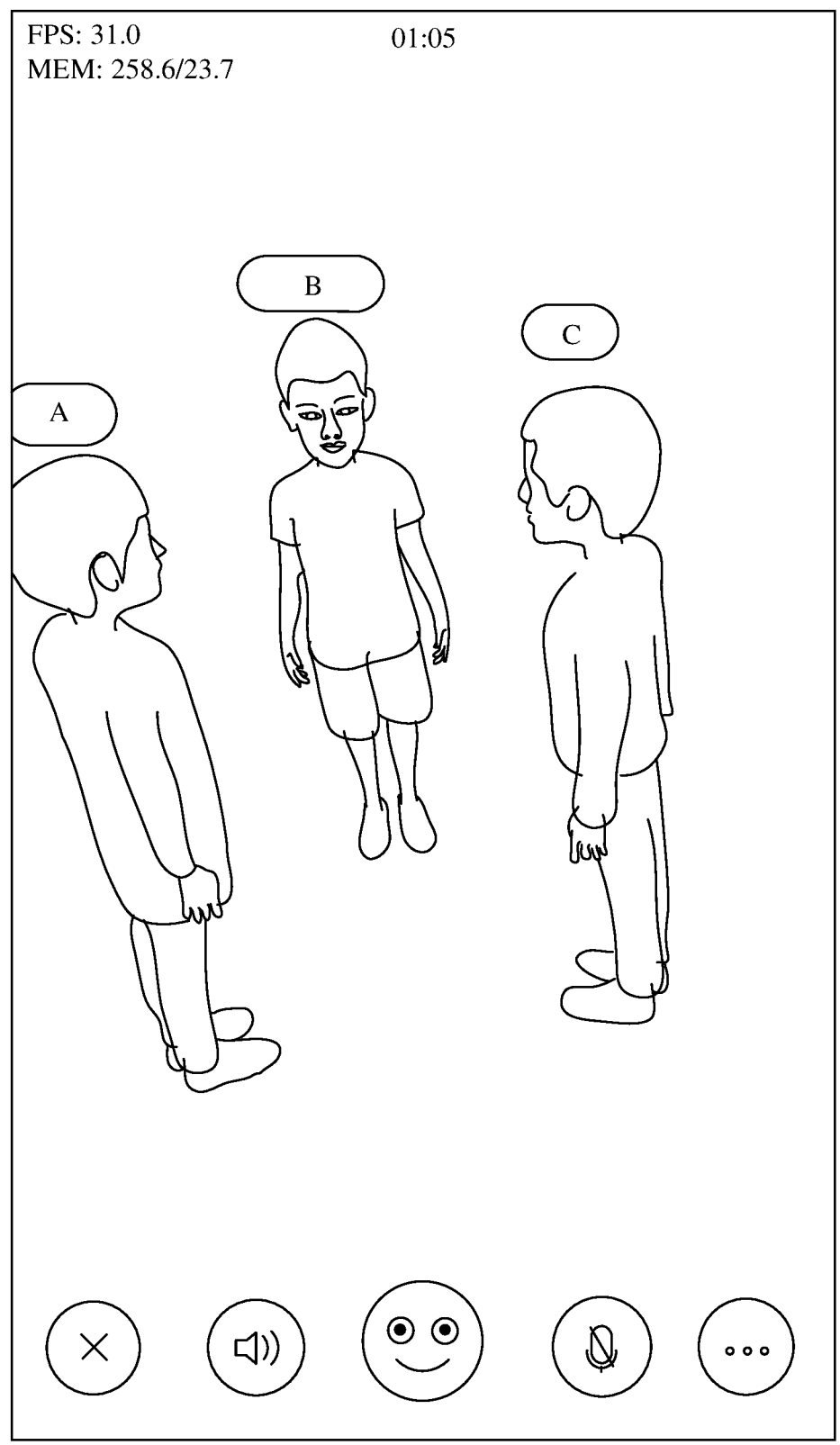
FIG. 5 is a schematic diagram of an interface of interaction among a plurality of users according to an example embodiment.

FIGS. 4 and 5 illustrate example embodiments in which an interface of interaction among a plurality of users is provided. FIG. 4 shows an interface of interaction between two users, and FIG. 5 shows an interface of interaction among a plurality of users.

It can be learned that according to the foregoing solutions, when communication is performed among a plurality of terminals, virtual images of users and an image of a current environment can be converged to obtain a first communication image, and then the first communication image is sent to at least one second terminal, to implement experience of communication and interaction among the plurality of terminals. The virtual image is converged in a real scene, so that visual experience is enhanced when the communication and interaction are performed between the plurality of the terminals.

Figure 6:
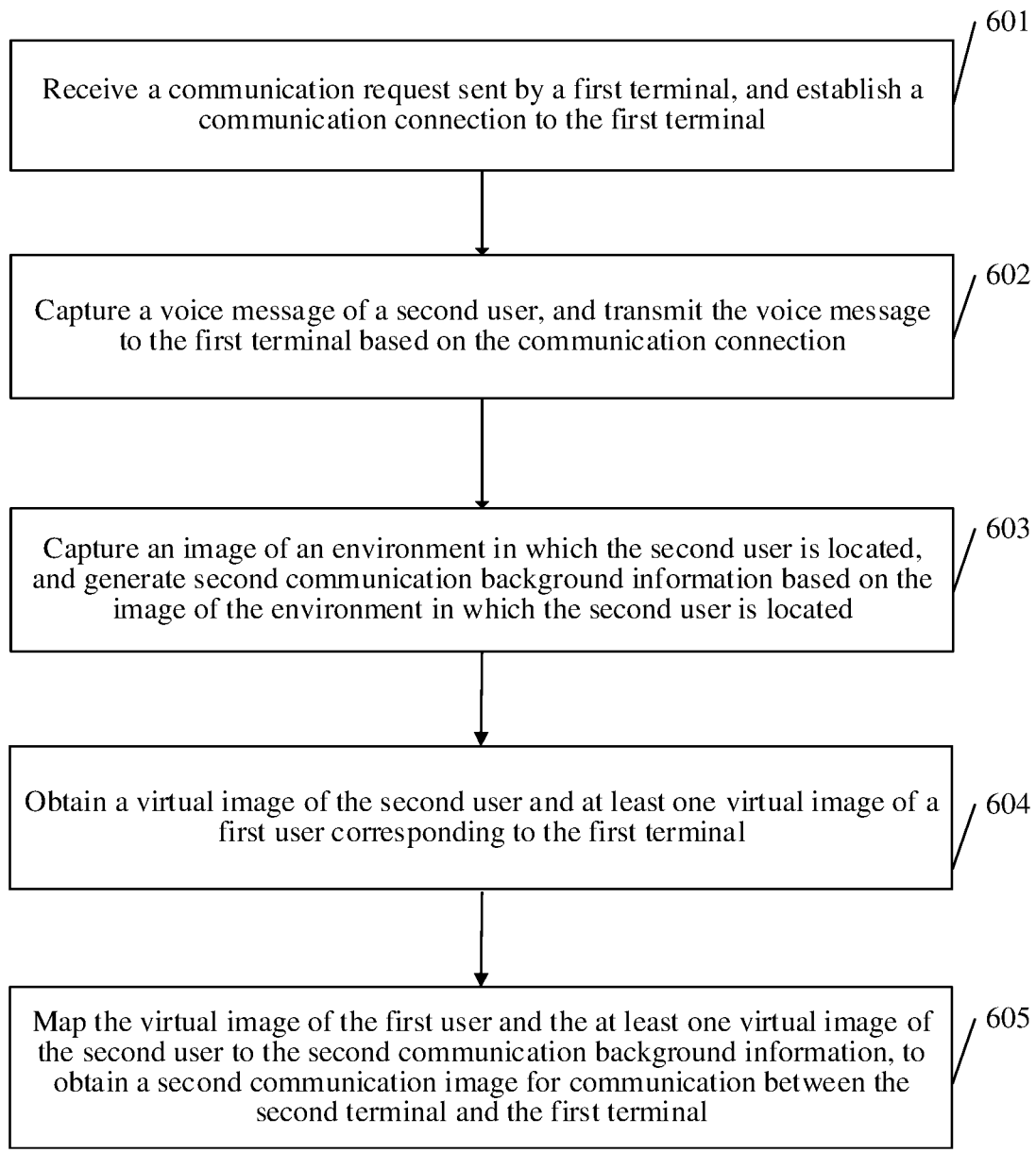
FIG. 6 is a schematic flowchart of a communication processing method according to an example embodiment.

According to an example embodiment, a communication processing method as described above may be applied to a second terminal. As shown in FIG. 6, the communication processing method may include the following operations:

Operation 601: Receive a communication request sent by a first terminal, and establish a communication connection to the first terminal.

Operation 602: Capture a voice message of a second user, and transmit the voice message to the first terminal based on the communication connection.

Operation 603: Capture an image of an environment in which the second user is located (or an image of an environment in which the second terminal is located), and generate second communication background information based on the image of the environment in which the second user is located.

Operation 604: Obtain a virtual image of the second user and at least one virtual image of a first user corresponding to the first terminal.

Operation 605: Map the virtual image of the second user and the at least one virtual image of the first user to the second communication background information, to obtain a second communication image for communication between the second terminal and the first terminal.

The second terminal herein may be a device that can establish a communication connection to another terminal through a mobile communications network or a wireless network. For example, the second terminal may be a device such as a smartphone, a tablet computer, or a notebook computer. Examples are not exhaustive in the disclosure.

Detailed descriptions are provided below for operation 601 and 602, that is, an operation of establishing a call between the first terminal and the second terminal:

1. A Client A (the first terminal) opens a session interface with a Client B (the second terminal).

2. The Client A taps a call button by using the session interface to initiate a real-time call request, where the real-time call request is sent to a real-time signaling server (Svr).

3. After receiving the call request from the Client A, the real-time signaling Svr creates a real-time room.

4. The real-time signaling Svr applies to a real-time data Svr for a data resource (which is mainly an access IP or the like).

5 and 6. Return, to the Client A, data indicating successful creation. In addition, the real-time signaling Svr pushes a call notification (including information about the data resource) to the Client B.

7. After receiving a result indicating that the real-time room (e.g., real-time chat room) is successfully created, the Client A starts pre-establishing a data channel with the real-time data Svr based on data access information. An objective of the pre-establishment herein is to enable entering a call process more quickly once the Client B answers the call.

8 and 9. After receiving the call notification from the Client A, the Client B answers the call and starts establishing a data channel with the real-time data Svr. Once the data channel is established, real-time data transmitting and receiving can be performed between the Client A and the Client B. If the Client B rejects the call, the real-time signaling Svr pushes a rejection notification to the Client A. After receiving the rejection notification, the Client A disconnects the data channel from the real-time data Svr, and ends the call.

10. After the data channels of the Client A and the Client B are both successfully established, the Client A and the Client B turn on respective audio devices, perform recording and transmitting, receiving and playing of voice data, and turn on respective local rear-facing cameras, to prepare to perform image capture.

It is to be noted that an establishment process for a real-time call among a plurality of users is similar to that between two users, and only a process of selecting a participant list is added when a call is initiated.

A process of generating a communication interface based on an image of an environment is described in detail below:

In an example embodiment, a manner of generating the second communication background information in operation 603 may directly use the image of the environment in which the second user is located as a second communication background. The image of the environment in which the second user is located may be processed, and the processed image may be used as the second communication background.

It may be understood that a manner of processing the image of the environment in which the first user is located may include a plurality of manners of processing such as gray-scale processing, and color, color tone, and saturation processing.

In an example embodiment, the obtaining a virtual image of the second user and mapping the virtual image of the second user to the second communication background information in operations 604 and 605 may include two scenarios. Processing manners in the two scenarios are similar to those in the foregoing first scenario and second scenario, and details are not described herein again.

It can be learned that according to the foregoing solutions, when communication is performed among a plurality of terminals, virtual images of users and an image of a current environment can be converged to obtain a first communication image, and then the first communication image is sent to at least one second terminal, to implement experience of communication and interaction among the plurality of terminals. The virtual image is converged in a real scene, so that visual experience is enhanced when the communication and interaction are performed between the plurality of the terminals.

Figure 7:
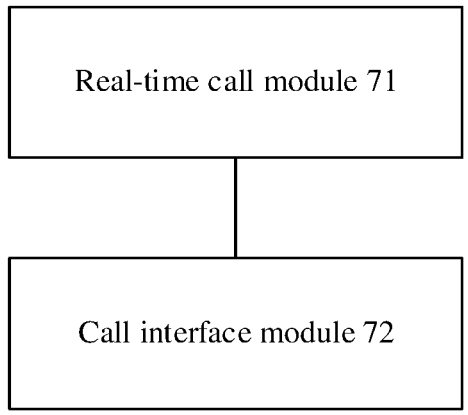
FIG. 7 is a schematic structural component diagram of a terminal according to an example embodiment.

FIG. 7 is a schematic structural component diagram of a terminal according to an example embodiment.

An example embodiment provides a terminal, as shown in FIG. 7, including:

a real-time call module 71, configured to initiate a communication request to at least one second terminal, and establish a communication connection to the at least one second terminal; and a call interface module 72, configured to: obtain a virtual image of a first user corresponding to the first terminal and at least one virtual image of a second user corresponding to the at least one second terminal; capture a real-scene image of an environment in which the first user is located (or an environment in which the first user is located); generate first communication background information based on the real-scene image of the environment in which the first user is located; and map the virtual image of the first user and the at least one virtual image of the second user to the first communication background information, to obtain a communication background during communication between the first terminal and the at least one second terminal.

The first terminal herein may be a device that can establish a communication connection to another terminal through a mobile communications network or a wireless network. For example, the first terminal may be a smartphone, a tablet computer, a notebook computer, a wearable device, or the like. Examples are not exhaustive in the disclosure.

In an example embodiment, that the real-time call module 71 is configured to initiate a communication request to at least one second terminal may initiate the communication request through the mobile communications network. For example, the real-time call module 71 may initiate the communication request to the second terminal by dialing a phone number of the second terminal or by using an account in a preset application. Establishing the communication connection may establish a communication connection among a plurality of terminals by using a server or may establish a communication connection by using a core network and a device such as a base station in the mobile communications network. Examples are not exhaustive in the disclosure, and an implementation of establishing the communication connection is not limited. In an example embodiment, there may be one or more second terminals.

In an example embodiment, the real-time call module 71 initiates the communication request by using a server, where the communication request is used for requesting to create virtual call space, and the communication request includes information about the at least one second terminal; receives from the server information indicating that the virtual call space is successfully created, where the information indicating that the virtual call space is successfully created includes a data resource allocated to the first terminal; establishes a data channel with the server based on the data resource allocated to the first terminal; and establishes, by the first terminal, the communication connection to the second terminal through the established data channel in a case that it is detected that the at least one second terminal accepts the communication request of the first terminal.

The request for creating the virtual call space may be a request for opening call space for a call initiated by the first terminal. That is, after the request is sent to the server, a server side (a real-time signaling server (Svr)) allocates a specific communication data resource to the first terminal.

In an example embodiment, after receiving a call request from a Client A, the real-time signaling Svr creates a real-time room. Then, the real-time signaling Svr applies to a real-time data Svr for a data resource (which is mainly an access IP or the like).

In an example embodiment, the server (namely, the real-time signaling Svr) returns, to the first terminal, data indicating successful creation, and the server side transmits the communication request to the at least one second terminal.

In an example embodiment, when the first terminal receives the information indicating that the virtual call space is successfully created that is sent by the server, the first terminal establishes the data channel with the server (the real-time signaling Svr), so that when receiving that the second terminal accepts the communication request, the first terminal instantly communicates with the second terminal through the established data channel.

In an example embodiment, after the first terminal and the at least one second terminal establish channels, the real-time call module 71 is further configured to enable a voice capture unit (for example, a microphone) when the communication connection is established, and capture a voice message by using the voice capture unit.

It is to be noted that an establishment process for a real-time call among a plurality of users is similar to that between two users, and only a process of selecting a participant list is added when a call is initiated.

A process of generating a communication interface based on an image of an environment is described in detail below:

In an example embodiment, the call interface module 72 is configured to use the image of the environment in which the first user is located as a first communication background;

or process the image of the environment in which the first user is located, and then use the processed image as the first communication background.

It may be understood that a manner of processing the image of the environment in which the first user is located may include a plurality of manners of processing such as gray-scale processing, and color, color tone, and saturation processing.

In an example embodiment, the obtaining a virtual image of a first user and mapping the virtual image of the first user to the first communication background information may include the following two scenarios:

First Scenario:

The call interface module 72 is configured to map the virtual image to a preset location in the first communication background information when the virtual image is mapped to the first communication background information for the first time. The preset location may be a middle location (or a center location of the first communication background), or may be another location set by the user. Examples are not exhaustive herein. A schematic diagram of this scenario according to an example embodiment is illustrated in FIG. 3, and the virtual image of the first user is placed at the middle location in the first communication image corresponding to the first communication background information. A schematic diagram of the scenario is illustrated in FIG. 3. The virtual image of the first user is placed at the middle location in the first communication background information to obtain a first communication image, and then first communication image is presented on a display area of the communication interface. In this scenario, the user can only view a picture including the virtual image of the user. That is, in this scenario, only the first communication image formed by using the virtual image of the first user is presented on the display area of the terminal of the first user regardless of whom the first user communicates with.

Second Scenario:

The call interface module 72 is configured to update the first communication background information based on an image of a changed environment; remap the virtual image of the first user and/or the virtual image of the second user to the first communication background information, to obtain an updated first communication image for the communication with the second terminal; and then present the updated first communication image on a display area of a communication interface in the terminal device of the first user.

In an example embodiment, processing of updating the first communication image in the second scenario is specifically described. Specifically, the call interface module 72 is further configured to determine, in response to detection of moving of the first terminal, that the environment in which the first user is located (or the environment in which the first user is located) changes, and capture the image of the changed environment in which the first user is located.

In an example embodiment, the call interface module 72 is further configured to determine, in response to detection of the rotation of the first terminal, that the environment in which the first user is located changes, and capture the image of the changed environment in which the first user is located.

In an example embodiment, a manner of detecting moving of the first terminal may be determining, based on a change of a currently captured image, whether the first terminal moves. For example, when the first terminal moves back and forth, a local area of the currently captured image being zoomed in or an increase in a quantity of images of the environment captured may occur, and whether the first terminal moves may be determined based on the change of the image of the environment.

When the first terminal moves, the currently captured image is used as the image of the changed environment.

In an example embodiment, detecting rotation of the first terminal may include detecting rotation by using a sensor built in the first terminal, and the sensor may be a gyroscope. When the rotation is detected based on the gyroscope, a current image may be captured as the image of the changed environment.

Further, after a real-time call is established, a local rear-facing camera is turned on, and a real-scene image captured in real time is used as a background of a chat scene. Therefore, the background changes as the camera moves, to converge a virtual character with a real scene.

In an example embodiment, the call interface module 72 is further configured to obtain at least one of a moving direction and a moving distance of the first terminal in response to detection of the moving of the first terminal; adjust the virtual image of the first user and the at least one virtual image of the second user based on the at least one of the moving direction and the moving distance, to obtain adjusted virtual images; and map the adjusted virtual images to the first communication background information, to obtain the updated communication background for the communication with the second terminal.

In an example embodiment, the moving direction may include a plurality of directions such as front, behind, left, right, up, and down. The foregoing several directions are merely examples and the disclosure is not limited. In an example implementation, the moving direction may be a combination of a plurality of directions such as front and up, and left and down.

The moving distance may be indicated by using two coordinate axes in a built-in three-dimensional coordinate system. For example, the three-dimensional coordinate system built in the first terminal includes three axial directions, namely, X, Y, and Z, and moving directions in the three axial directions may be used for indicating the moving direction.

Adjusting the virtual image based on the at least one of the moving direction and the moving distance may include that, when the moving direction and the moving distance are in a Z-axis direction, zoom-in and zoom-out of the virtual image may be determined based on whether a change direction in the Z axis is a positive direction or a negative direction.

Alternatively, when the captured image of the environment is zoomed in (e.g., a local image in the currently captured image of the environment is zoomed in to an entire screen), a multiple by which the image is zoomed in may be obtained, and then the virtual image is zoomed in at a same ratio. Otherwise, when there is more environment content in the captured image of the environment than before (where for example, a target area may be detected), it may be considered that the image is zoomed out, a zoom-out ratio is obtained, and the virtual image in the first communication image is zoomed out at a same ratio.

In an example embodiment, the virtual image in the first communication image may be considered as the virtual image of the first user, or the virtual image of the first user and the virtual image of the second user. For example, when the first communication image only includes the virtual image of the first user, the virtual image of the first user in the first communication image may be zoomed in or zoomed out. When the first communication image includes the virtual images of the first user and the second user, only the virtual image of the first user may be zoomed in or zoomed out. The virtual images of the first user and the second user may be both zoomed in or zoomed out based on setting of the user.

That is, when the rear-facing camera moves, a change of the current background is detected and traced in real time, and a location of the virtual character image is remapped, to achieve an AR experience effect that changes according to the distance and the direction of the movement of the first terminal (or the rear-facing terminal). For example, the virtual character image is zoomed out and zoomed in based on different distances of the movement of the first terminal (or the camera), and the virtual character image is displayed at different angles based on different directions of the movement of the first terminal (or the camera).

In an example embodiment, when the first terminal moves in a horizontal direction, the virtual image may not need to be zoomed in or zoomed out, and only the location of the virtual image in the first background information may be adjusted. For example, in a case where a distance for which the first terminal moves in an X-axis direction is a, and a distance for which the first terminal moves in a Y-axis direction is b, the virtual image may be adjusted by the distance a in the X-axis and adjusted by the distance b in the Y-axis. Alternatively, the virtual image may be adjusted at a ratio between the distance a and the distance b in the X-axis and the Y-axis.

In an example embodiment, the call interface module 72 is further configured to obtain at least one of a rotation direction and a rotation angle of the first terminal in response to detection of the rotation of the first terminal; adjust the virtual image of the first user and the at least one virtual image of the second user based on the at least one of the rotation direction and the rotation angle, to obtain adjusted virtual images; and map the adjusted virtual images to the first communication background information, to obtain the updated communication background for the communication with the second terminal.

In an example embodiment, a distance effect (or an effect of creating a distance change) according to movement of the first terminal is achieved by calculating a change ratio of the background in real time while using the virtual character image as a mark point, to zoom the character image. A direction effect (or an effect of creating a direction change) is achieved by calculating a rotation angle by using a change result of the gyroscope in the first terminal (e.g., mobile phone) and then rotating the current character image according to the rotation angle. It may be understood that the rotation angle may be a rotation angle corresponding to each axial direction in the three-dimensional coordinate system built in the first terminal, and the rotation angle of the virtual image may be adjusted by using the rotation angle of each axial direction.

In an example embodiment, the first terminal may transmit the generated first communication image to the at least one second terminal, so that the at least one second terminal generates, based on the first communication image, a communication interface to be presented by the second terminal.

In an example embodiment, the call interface module 72 is further configured to receive, through the communication connection, at least one second communication image sent by the at least one second terminal; and generate a communication interface based on the at least one second communication image, and present the communication interface.

That is, when obtaining the first communication image, the first terminal may transmit the first communication image to the second terminal, so that the second terminal obtains the communication image of the first user of the first terminal. In addition, the first terminal also generates the communication interface of the first terminal. An example method of generating the communication interface may include directly combining the second communication image of each second terminal and presenting the combined second communication image on the communication interface of the first terminal.

In an example embodiment, the call interface module 72 is further configured to extract the virtual image of the user of the second terminal in the second communication image, and place the virtual image in the first communication background information to generate the communication interface of the first terminal.

In an example embodiment, the call interface module 72 is further configured to combine the virtual image of the user of the second terminal and the virtual image of the first user of the first terminal, and then display the combined virtual image in the first communication background information, to generate the communication interface of the first terminal.

In an example embodiment, the call interface module 72 is further configured to respectively set the first communication image and the at least one second communication image on different display areas, and form the communication interface of the first terminal by using the different display areas.

For an interface of interaction among a plurality of users that is provided in example embodiments, FIG. 4 and FIG. 5 may be referred to. FIG. 4 shows an interface of interaction between two users, and FIG. 5 shows an interface of interaction among a plurality of users.

Figure 8:
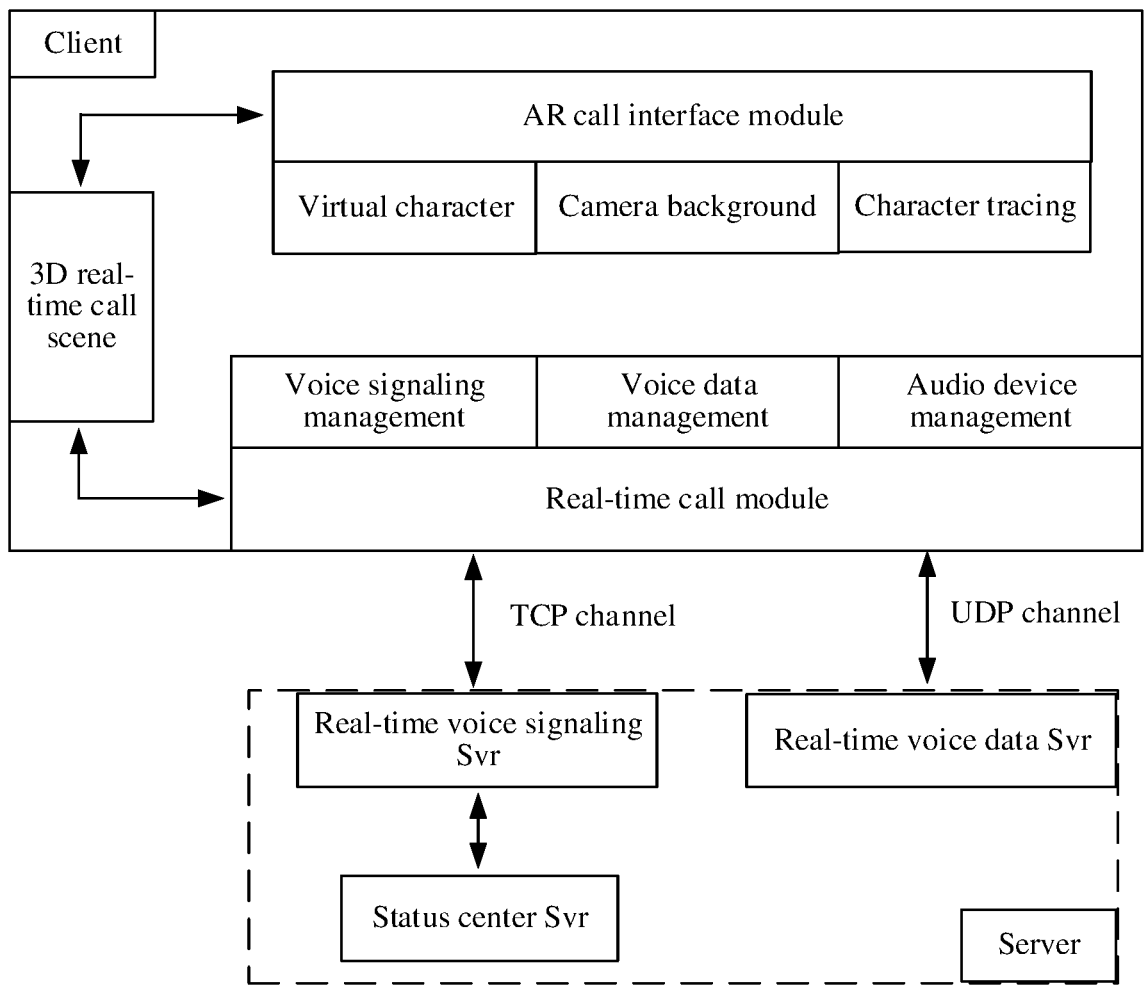
FIG. 8 is an architectural diagram of a system according to an example embodiment.

Further, with reference to FIG. 8, implementation of a basic technical architecture of this solution may include the following elements:

(1) the call interface module: mainly for implementing display of a 3D call-scene interface and a virtual character and rendering of an AR effect; and (2) the real-time call module: mainly for implementing channel establishment for a voice call, signaling management, device management, audio data transmitting and receiving, and the like.

It can be learned that according to the foregoing solution, when communication is performed among a plurality of terminals, virtual images of users and an image of a current environment can be converged to obtain a first communication image, and then the first communication image is sent to at least one second terminal, to implement experience of communication and interaction among the plurality of terminals. The virtual image is converged in a real scene, so that visual experience is enhanced when the communication and interaction are performed between the plurality of the terminals.

In an example embodiment, a terminal is provided. The terminal includes a memory and a processor. The memory stores computer-readable instructions, and the computer-readable instructions, when executed by the processor, cause the processor to perform the following operations: initiating a communication request to at least one second terminal, and establishing a communication connection to the at least one second terminal; obtaining a virtual image of a first user corresponding to the first terminal and at least one virtual image of a second user corresponding to the at least one second terminal; capturing a real-scene image of an environment in which the first user is located; generating first communication background information based on the real-scene image of the environment in which the first user is located; and mapping the virtual image of the first user and the at least one virtual image of the second user to the first communication background information, to obtain a communication background during communication between the first terminal and the at least one second terminal.

In an example embodiment, the computer-readable instructions, when executed by the processor, further cause the processor to perform the following operations: capturing a real-scene image of a changed environment based on a change of the environment in which the first user is located; updating the first communication background information by using the real-scene image of the changed environment; and mapping the virtual image of the first user and the at least one virtual image of the second user to the updated first communication background information, to obtain an updated communication background during the communication between the first terminal and the at least one second terminal.

In an example embodiment, the computer-readable instructions, when executed by the processor, cause the processor to, in the operation of capturing a real-scene image of a changed environment based on a change of the environment in which the first user is located, perform the following: determining, in response to detection of moving of the first terminal, that the environment in which the first user is located changes, and capturing the real-scene image of the changed environment.

In an example embodiment, the computer-readable instructions, when executed by the processor, cause the processor to, in the operation of capturing a real-scene image of a changed environment based on a change of the environment in which the first user is located, perform: determining, in response to detection of rotation of the first terminal, that the environment in which the first user is located changes, and capturing the real-scene image of the changed environment.

In an example embodiment, the computer-readable instructions, when executed by the processor, cause the processor to, in the operation of mapping the virtual image of the first user and the at least one virtual image of the second user to the updated first communication background information, perform: obtaining at least one of a moving direction and a moving distance of the first terminal in response to detection of the moving of the first terminal; adjusting the virtual image of the first user and the at least one virtual image of the second user based on the at least one of the moving direction and the moving distance, to obtain adjusted virtual images; and mapping the adjusted virtual images to the first communication background information, to obtain the updated communication background for the communication between the first terminal and the second terminal.

In an example embodiment, the computer-readable instructions, when executed by the processor, cause the processor to, in the operation of mapping the virtual image of the first user and the at least one virtual image of the second user to the updated first communication background information, to perform: obtaining at least one of a rotation direction and a rotation angle of the first terminal in response to detection of the rotation of the first terminal; adjusting the virtual image of the first user and the at least one virtual image of the second user based on the at least one of the rotation direction and the rotation angle, to obtain adjusted virtual images; and mapping the adjusted virtual images to the first communication background information, to obtain the updated communication background for the communication between the first terminal and the second terminal.

In an example embodiment, the computer-readable instructions, when executed by the processor, cause the processor to, in the operation of initiating a communication request to at least one second terminal, and establishing a communication connection to the at least one second terminal, perform: initiating the communication request by using a server, where the communication request is used for requesting to create virtual call space, and the communication request includes information about the at least one second terminal; receiving from the server information indicating that the virtual call space is successfully created, where the information indicating that the virtual call space is successfully created includes a data resource allocated to the first terminal; establishing a data channel with the server based on the data resource allocated to the first terminal; and establishing, by the first terminal, the communication connection to the at least one second terminal through the established data channel in a case that it is detected that the at least one second terminal accepts the communication request of the first terminal.

In an example embodiment, the computer-readable instructions, when executed by the processor, further cause the processor to perform: capturing a voice message of the first user, and transmitting the voice message to the at least one second terminal based on the communication connection.

A non-volatile computer-readable storage medium is provided. The non-volatile computer-readable storage medium stores computer-readable instructions, and the computer-readable instructions, when executed by one or more processors, cause the one or more processors to perform: initiating a communication request to at least one second terminal, and establishing a communication connection to the at least one second terminal; obtaining a virtual image of a first user corresponding to the first terminal and at least one virtual image of a second user corresponding to the at least one second terminal; capturing a real-scene image of an environment in which the first user is located; generating first communication background information based on the real-scene image of the environment in which the first user is located; and mapping the virtual image of the first user and the at least one virtual image of the second user to the first communication background information, to obtain a communication background during communication between the first terminal and the at least one second terminal.

In an example embodiment, the computer-readable instructions, when executed by the processor, further cause the processor to perform: capturing a real-scene image of a changed environment based on a change of the environment in which the first user is located; updating the first communication background information by using the real-scene image of the changed environment; and mapping the virtual image of the first user and the at least one virtual image of the second user to the updated first communication background information, to obtain an updated communication background during the communication between the first terminal and the at least one second terminal.

In an example embodiment, the computer-readable instructions, when executed by the processor, cause the processor to perform, in the operation of capturing a real-scene image of a changed environment based on a change of the environment in which the first user is located: determining, in response to detection of moving of the first terminal, that the environment in which the first user is located changes, and capturing the real-scene image of the changed environment.

In an example embodiment, the computer-readable instructions, when executed by the processor, cause the processor to perform, in the operation of capturing a real-scene image of a changed environment based on a change of the environment in which the first user is located: determining, in response to detection of rotation of the first terminal, that the environment in which the first user is located changes, and capturing the real-scene image of the changed environment.

In an example embodiment, the computer-readable instructions, when executed by the processor, cause the processor to perform, in the operation of mapping the virtual image of the first user and the at least one virtual image of the second user to the updated first communication background information, to obtain an updated communication background during the communication between the first terminal and the at least one second terminal: obtaining at least one of a moving direction and a moving distance of the first terminal in response to detection of the moving of the first terminal; adjusting the virtual image of the first user and the at least one virtual image of the second user based on the at least one of the moving direction and the moving distance, to obtain adjusted virtual images; and mapping the adjusted virtual images to the first communication background information, to obtain the updated communication background for the communication between the first terminal and the second terminal.

In an example embodiment, the computer-readable instructions, when executed by the processor, cause the processor to perform, in the operation of mapping the virtual image of the first user and the at least one virtual image of the second user to the updated first communication background information: obtaining at least one of a rotation direction and a rotation angle of the first terminal in response to detection of the detection of the first terminal; adjusting the virtual image of the first user and the at least one virtual image of the second user based on the at least one of the rotation direction and the rotation angle, to obtain adjusted virtual images; and mapping the adjusted virtual images to the first communication background information, to obtain the updated communication background for the communication between the first terminal and the second terminal.

In an example embodiment, the computer-readable instructions, when executed by the processor, cause the processor to perform, in the operation of initiating a communication request to at least one second terminal, and establishing a communication connection to the at least one second terminal: initiating the communication request by using a server, where the communication request is used for requesting to create virtual call space, and the communication request includes information about the at least one second terminal; receiving from the server information indicating that the virtual call space is successfully created, where the information indicating that the virtual call space is successfully created includes a data resource allocated to the first terminal; establishing a data channel with the server based on the data resource allocated to the first terminal; and establishing, by the first terminal, the communication connection to the at least one second terminal through the established data channel in a case that it is detected that the at least one second terminal accepts the communication request of the first terminal.

In an example embodiment, the computer-readable instructions, when executed by the processor, further cause the processor to perform: capturing a voice message of the first user, and transmitting the voice message to the at least one second terminal based on the communication connection.

In the several example embodiments provided in the disclosure, it should be understood that the disclosed device and method may be implemented in other manners. The described device embodiments are merely exemplary. For example, the unit division may be merely logical function division and may be other division during actual implementation. For example, a plurality of units or components may be combined or integrated into another system, or some features may be ignored or not performed. In addition, the displayed or discussed mutual couplings or direct couplings or communication connections between the components may be implemented through some interfaces. The indirect couplings or communication connections between the devices or units may be implemented in electronic, mechanical, or other forms.

The units described as separation parts may be or may not be physically separated. The parts displayed as units may be or may not be a physical unit. That is, the units may be located in a same place, or may be distributed to many network units. Some or all of the units need to be selected according to actual requirements to implement the purpose of the solutions of the embodiments.

In addition, in the example embodiments, the functional units may be all integrated into one processing unit. Alternatively, the units may be respectively used as a unit, or two or more units may be integrated into one unit. The integrated unit may be implemented in a hardware form, or may be implemented in a form of hardware plus a software functional unit.

A person of ordinary skill in the art may understand that, some or all of operations for implementing the method embodiments may be implemented by a program instructing relevant hardware. The program may be stored in a computer-readable storage medium. When the program is executed, the operations including the method embodiments are performed. The storage medium includes various t media that can store program code, for example, a mobile storage device, a read-only memory (ROM), a random access memory (RAM), a magnetic disk, or an optical disk.

Alternatively, when the integrated unit in disclosure is implemented in the form of a software function module and sold or used as an independent product, the integrated module may be stored in a computer-readable storage medium. Based on such an understanding, the technical solutions of the embodiments of the disclosure essentially, or the part contributing to the related technology may be implemented in a form of a software product. The computer software product is stored in a storage medium, and includes several instructions for instructing a computer device (which may be a personal computer, a server, a network device, or the like) to perform all or some of the operations of the methods described in the embodiments of the disclosure. The foregoing storage medium includes: any medium that can store program code, such as a removable storage device, a ROM, a RAM, a magnetic disk, or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A communication processing method, performed by a first terminal, the first terminal comprising at least one memory and at least one processor, and the method comprising:
    requesting a server for a virtual call space with at least one second terminal and, based on a notification that the virtual call space is successfully created, establishing a communication connection to the at least one second terminal to perform a virtual call;
    obtaining a virtual image of a first user corresponding to the first terminal;
    turning on a camera of the first terminal based on the communication connection being established and capturing a real-scene image of an environment in which the first terminal is located by using the camera;
    receiving at least one second communication image generated based on a combination of a virtual image of a second user corresponding to the at least one second terminal and a real-scene image of an environment in which each of the at least one second terminal is located, which is captured by using a camera of each of the at least one second terminal, and extracting the virtual image of the second user from the at least one second communication image;
    combining the captured real-scene image with the virtual image of the first user and the virtual image of the second user, to obtain a first communication image to be used in a virtual call interface between the first terminal and the at least one second terminal;
    transmitting the first communication image to the at least one second terminal such that a virtual call interface that is generated based on the first communication image is provided on the at least one second terminal; and
    receiving, from the at least one second terminal, each another second communication image generated by each of the at least one second terminal by combining a captured real-scene image of the environment in which each of the at least one second terminal is located with the virtual image of the first user and the virtual image of the second user, and displaying the first communication image and each another second communication image of each of the at least one second terminal in a plurality of display areas of the virtual call interface provided on the first terminal,
    wherein the method further comprises:
        detecting at least one of a movement in a back and forth direction of the first terminal and a rotation along an axial direction of the first terminal and adjusting the virtual image of the first user and the virtual image of the second user to be zoomed or rotated according to detection of at least one of the movement and the rotation of the first terminal;
        capturing a real-scene image of a changed environment based on a change of the environment in which the first terminal is located, according to the detection of the at least one of the movement and the rotation of the first terminal;
        combining the captured real-scene image of the changed environment with the adjusted virtual image of the first user and the adjusted virtual image of the second user, to obtain an updated first communication image in the virtual call interface between the first terminal and the at least one second terminal; and
        transmitting the updated first communication image to the at least one second terminal such that a virtual call interface that is generated based on the updated first communication image is provided on the at least one second terminal.

2. The method according to claim 1, wherein the capturing the real-scene image of the changed environment comprises:
    determining, in response to detection of the movement of the first terminal, that the environment in which the first terminal is located changes, and capturing the real-scene image of the changed environment.

3. The method according to claim 1, wherein the capturing the real-scene image of the changed environment comprises:
    determining, in response to detection of the rotation of the first terminal, that the environment in which the first terminal is located changes, and capturing the real-scene image of the changed environment.

4. The method according to claim 1,
    wherein the notification that the virtual call space is successfully created comprises information on a data resource allocated to the first terminal;
    wherein the establishing the communication connection to the at least one second terminal comprises:
    establishing a data channel with the server based on the data resource allocated to the first terminal; and
    establishing, by the first terminal, the communication connection to the at least one second terminal through the established data channel.

5. The method according to claim 1, further comprising:
    capturing a voice message of the first user, and transmitting the voice message to the at least one second terminal based on the communication connection.

6. The method according to claim 1, wherein the adjusting comprises adjusting the virtual image of the first user and the virtual image of the second user to be zoomed in or zoomed out at a ratio determined according to the movement back and forth direction of the first terminal.

7. The method according to claim 1, wherein the adjusting comprises rotating the virtual image of the first user and the virtual image of the second user according to the at least one of a rotation direction and a rotation angle in the rotation along the axial direction of the first terminal.

8. A terminal, comprising:
at least one memory operable to store program code; and
at least one processor operable to read the program code and operate as instructed by the program code, the program code comprising:
real-time call code configured to cause at least one of the at least one processor to request a server for a virtual call space with at least one second terminal and, based on a notification that the virtual call space is successfully created, establish a communication connection to the at least one second terminal to perform a virtual call; and
call interface code configured to cause at least one of the at least one processor to:
obtain a virtual image of a first user corresponding to the terminal;
turn on a camera of the terminal based on the communication connection being established and capture a real-scene image of an environment in which the terminal is located by using the camera;
receive at least one second communication image generated based on a combination of a virtual image of a second user corresponding to the at least one second terminal and a real-scene image of an environment in which each of the at least one second terminal is located, which is captured by using a camera of each of the at least one second terminal, and extract the virtual image of the second user from the at least one second communication image; and
combine the captured real-scene image with the virtual image of the first user and the virtual image of the second user, to obtain a first communication image to be used in a virtual call interface between the terminal and the at least one second terminal,
transmission code configured to cause at least one of the at least one processor to transmit the first communication image to the at least one second terminal such that a communication virtual call interface that is generated based on the first communication image is provided on the at least one second terminal;
receipt code configured to cause at least one of the at least one processor to receive, from the at least one second terminal, each another second communication image generated by each of the at least one second terminal by combining a captured real-scene image of the environment in which each of the at least one second terminal is located with the virtual image of the first user and the virtual image of the second user; and
display code configured to cause at least one of the at least one processor to display the first communication image and each another second communication image of each of the at least one second terminal in a plurality of display areas of the virtual call interface provided on the terminal,
wherein the call interface code is further configured to cause at least one of the at least one processor to:
detect at least one of a movement in a back and forth direction of the terminal and a rotation along an axial direction of the terminal and adjusting the virtual image of the first user and the virtual image of the second user to be zoomed or rotated according to detection of at least one of the movement and the rotation of the terminal;
capture a real-scene image of a changed environment based on a change of the environment in which the terminal is located, according to the detection of the at least one of the movement and the rotation of the terminal; and
combine the captured real-scene image of the changed environment with the adjusted virtual image of the first user and the adjusted virtual image of the second user, to obtain an updated first communication image in the virtual call interface between the terminal and the at least one second terminal, and
wherein the transmission code configured to cause at least one of the at least one processor to transmit the updated first communication image to the at least one second terminal such that a virtual call interface that is generated based on the updated first communication image is provided on the at least one second terminal.

9. The terminal according to claim 8, wherein the call interface code causes at least one of the at least one processor to determine, in response to detection of the movement of the terminal, that the environment in which the terminal is located changes, and capture the real-scene image of the changed environment.

10. The terminal according to claim 8, wherein the call interface code causes at least one of the at least one processor to determine, in response to detection of the rotation of the terminal, that the environment in which the terminal is located changes, and capture the real-scene image of the changed environment.

11. The terminal according to claim 8, wherein the notification that the virtual call space is successfully created comprises information on a data resource allocated to the terminal, and the real-time call code causes at least one of the at least one processor to: establish a data channel with the server based on the data resource allocated to the terminal; and establish the communication connection to the at least one second terminal through the established data channel.

12. The terminal according to claim 8, wherein the real-time call code causes at least one of the at least one processor to capture a voice message of the first user, and transmit the voice message to the at least one second terminal based on the communication connection.

13. A non-transitory computer readable storage medium, storing computer-readable instructions executable by at least one processor to perform:
requesting a server for a virtual call space with at least one second terminal and, based on a notification that the virtual call space is successfully created, establishing a communication connection to the at least one second terminal to perform a virtual call;
obtaining a virtual image of a first user corresponding to a first terminal;
turning on a camera of the first terminal based on the communication connection being established and capturing a real-scene image of an environment in which the first terminal is located by using the camera;
receiving at least one second communication image generated based on a combination of a virtual image of a second user corresponding to the at least one second terminal and a real-scene image of an environment in which each of the at least one second terminal is located, which is captured by using a camera of each of the at least one second terminal, and extracting the virtual image of the second user from the at least one second communication image;

combining the captured real-scene image with the virtual image of the first user and the virtual image of the second user, to obtain a first communication image to be used in a virtual call interface between the first terminal and the at least one second terminal;

transmitting the first communication image to the at least one second terminal such that a virtual call interface that is generated based on the first communication image is provided on the at least one second terminal; and receiving, from the at least one second terminal, each another second communication image generated by each of the at least one second terminal by combining a captured real-scene image of the environment in which each of the at least one second terminal is located with the virtual image of the first user and the virtual image of the second user, and displaying the first communication image and each second another communication image of each of the at least one second terminal in a plurality of display areas of the virtual call interface provided on the first terminal, wherein the computer-readable instructions are executable by the at least one processor to further perform:

detecting at least one of a movement in a back and forth direction of the first terminal and a rotation along an axial direction of the first terminal and adjusting the virtual image of the first user and the virtual image of the second user to be zoomed or rotated according to detection of at least one of the movement and the rotation of the first terminal;

capturing a real-scene image of a changed environment based on a change of the environment in which the first terminal is located, according to the detection of the at least one of the movement and the rotation of the first terminal;

combining the captured real-scene image of the changed environment with the adjusted virtual image of the first user and the adjusted virtual image of the second user, to obtain an updated first communication image in the virtual call interface between the first terminal and the at least one second terminal; and transmitting the updated first communication image to the at least one second terminal such that a virtual call interface that is generated based on the updated first communication image is provided on the at least one second terminal.

14. The storage medium according to claim 13, wherein the computer-readable instructions are executable by the at least one processor to perform:

determining, in response to detection of the movement of the first terminal, that the environment in which the first terminal is located changes, and capturing the real-scene image of the changed environment.

15. The storage medium according to claim 13, wherein the computer-readable instructions are executable by the at least one processor to perform:

determining, in response to detection of the rotation of the first terminal, that the environment in which the first terminal is located changes, and capturing the real-scene image of the changed environment.

* * * * *